May 22, 1945.　　　G. D. GULER ET AL　　　2,376,482
TEMPERATURE CONTROL SYSTEM
Filed Oct. 27, 1941
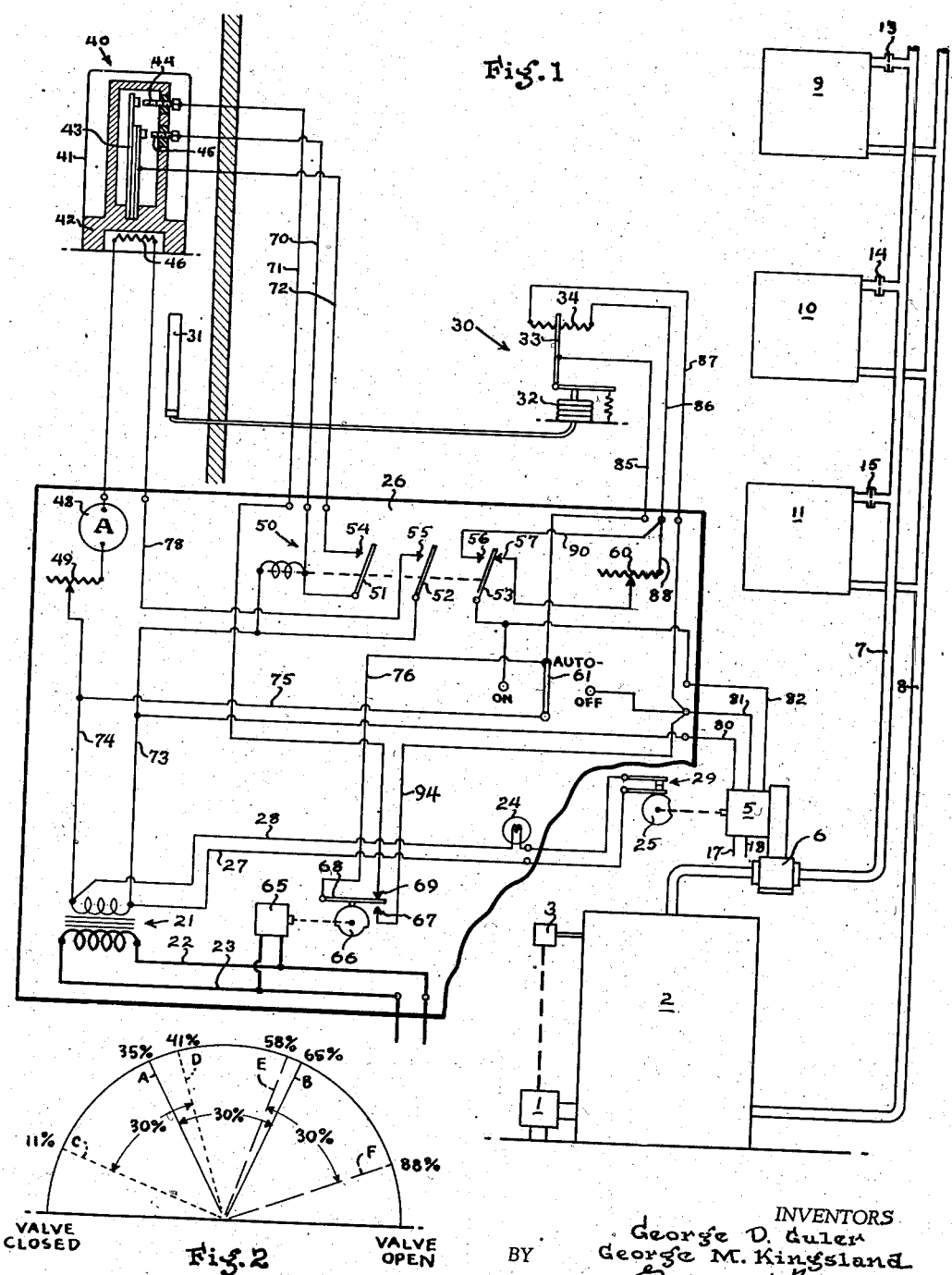
INVENTORS
George D. Guler
George M. Kingsland
BY George H. Fisher
Attorney Patented May 22, 1945

2,376,482

UNITED STATES PATENT OFFICE 2,376,482

TEMPERATURE CONTROL SYSTEM

George D. Guler, White Plains, N. Y., and George M. Kingsland, Denver, Colo., assignors to Minneapolis-Honeywell Regulator Company, Minneapolis, Minn., a corporation of Delaware Application October 27, 1941, Serial No. 416,642

2 Claims. (Cl. 236—91)

This invention relates broadly to a control system for the regulation of valve or damper means. In particular the invention relates to a system of control for valve or damper means for metering a supply of heat exchange medium employed for conditioning a zone or a plurality of zones in accordance with outdoor factors affecting the heat losses of the zone or zones.

An object of the invention is to provide a method for controlling a zone air conditioning system to maintain a uniform zone temperature by metering the heat exchange medium in accordance with a measured demand including therein such factors as outside temperature, wind velocity, wind direction and solar radiation. A further object of the invention is to provide for the control of a steam heating system for a building in accordance with outside weather conditions in which a continuous and metered flow of steam is employed during periods of relatively low outdoor temperature and an on and off steam flow is provided during periods of mild weather. A more particular object of the invention is to maintain a substantially constant temperature in a zone or in zones by the provision of means for supplying a heat exchange medium in an on and off manner to prevent overheating and assure a uniform supply of heat throughout the zone or zones during mild weather and for maintaining a continuous supply of heat exchange medium which is metered to assure immediate response to changing conditions together with the elimination of air stratification and objectionable expansion noises during cold weather.

Further objects and advantages of the invention will be apparent from the following description of the embodiment of the invention illustrated in the drawing.

Figure 1 is a schematic representation of the invention as applied to a steam heating system, and Figure 2 is a graphic representation of the operation of the steam supply valve 6 illustrated in Figure 1.

The invention has particular utility in the field of air conditioning in the control of valves and dampers for regulating a flow of heat exchange medium. A preferred form of the invention relating to the control of a valve for metering the flow of steam in a steam heating system to maintain comfortable conditions throughout an entire building while eliminating distribution difficulties encountered by systems which provide for modulation of steam flow at all outdoor temperatures is illustrated in the drawing. The system may be employed to control a single or a plurality of zones. In Figure 1 any well known type of burner 1, such as coal, oil, or gas, is employed to generate a constant supply of steam in the boiler 2. A well known form of control 3 such as a pressure controller or even an indicator may be employed to assure the constant supply of steam. A modulating motor 5 which may be of the type described in the patent to D. G. Taylor Number 2,028,110, issued January 14, 1936, is employed to control a valve 6 for regulating the flow of steam to the inlet line 7 for supplying heat to the radiators 9, 10 and 11 of the heating system. Orifices 13, 14 and 15 respectively are employed to properly apportion the steam supply to each radiator in a manner known in the art. A return line 8 is provided for the heating medium.

The primary windings of a transformer 21 are connected to a suitable source of power through the lines 22 and 23 and the secondary windings of the transformer supply the power for operation of the control system in general. The motorized valve is operated from a source of power obtained from the lines 17 and 18. A signal device such as a lamp 24 may be located on a panel 26. This lamp is connected by lines 27 and 28 from the transformer 21 through a switch 29 operated by a cam 25 secured to the shaft of the motorized valve for indicating valve open and closed positions. The cam 25 operates to close the switch 29 and energize the lamp 24 for all open positions of the valve 6.

An outdoor temperature responsive controller of a modulating and remote acting type is indicated by the reference character 30. A temperature responsive bulb 31 located outdoors operates on a vapor tension principle to actuate a bellows 32 for positioning a pivoted and biased potentiometer slider arm 33 with respect to the potentiometer resistance 34. The controller 30 serves to regulate the operation of the motorized valve 6 in a graduated manner as hereinafter described. Controller 30 may be of the type disclosed in the patent to D. G. Taylor 2,159,513, which issued on May 23, 1939.

An outdoor condition responsive controller indicated generally at 40 and responsive to weather factors affecting heat losses from a building such as outside temperature, wind velocity, wind direction and solar radiation is employed to exert a primary control action for regulating the steam supply valve 6 and this action is modified by the outdoor temperature responsive controller 30. The controller 40 is formed of a metallic polished cylinder 41 housing a metallic block or mass 42 in which is supported a thermostatic element 43 for operating the adjustable switches 44 and 45 and it likewise houses an electrical heating element 46. The design of the metallic mass and the adjustment of the heater output is such that the control unit will gain or lose heat at a rate proportional to that of the building which it is controlling. The thermostat of the controller 40 may accordingly be employed to control the heat input to the building as well as to the controller. The controller may be of the type described in the patents to D. G. Taylor, 2,065,835, issued December 29, 1936, and 2,146,604, issued February 7, 1939. An ammeter 48 may be located on the panel 26 and have a scale that is calibrated for building or zone design temperatures and also for indicating the current and heat supply for the controller heating element 46. The design temperature for a zone is that outdoor temperature at which heat will be required 100% of the time to maintain the desired temperature. A manually adjustable resistance 49 in series with the heating element for the controller 40 may likewise be located on the panel 26 for convenient adjustment of the controller operation. A relay 50, also located on the panel 26, is employed for operating a series of switches 51, 52 and 53 in connection with the switch contacts 54, 55, 56 and 57, respectively, in a manner hereinafter described. An adjustable resistance 60 is inserted in or shunted out of the control circuit for the motorized valve under the control of the relay actuated switch 53 and the switch contacts 56 and 57, respectively, for varying and limiting the valve operation in a manner to be described.

Provision is made for manual operation of the system by operation of the switch 61 when such operation is desired as, for example, during relatively irregular periods of non-occupancy of the building. Operation of the switch 61 to the "off" position serves to complete a circuit which includes the switch 61, wire 81, motor 5, wire 80, wire 73, the secondary winding of transformer 21, wire 74 and the wire 75 connected to the switch 61. The motor control circuit which is of the balanced modulating type is unbalanced with a result that the motor 5 will operate to close the valve 6. When the manually operated switch is placed in the "on" position a circuit is completed which includes the switch 61, wire 82, motor 5, wire 80, wire 73, secondary winding of the transformer 21, wire 74, and the wire 75 returning to the switch 61. It is apparent that this causes an unbalance of the motor control circuit which results in operation of the motor 5 to fully open the valve 6.

If desired for day operation and night shutdown of the system, or for periodic operation of the system an electric clock 65 receiving power from the lines 22 and 23 may be employed to operate a cam 66 having an adjustable raised portion to periodically position a switch 68. The switch 68 is actuated to close the contact 67 for curtailing the operation of the system, and a circuit is then completed which includes the switch 68, wire 94, wire 81, motor 5, wire 80, wire 73, secondary winding of transformer 21, wire 74, wire 75, switch 61, and the wire 76 returning to the switch 68. This circuit results in unbalancing the motor control circuit and operates the motor for closing the valve 6. The system is restored to the automatic control when the timer positions the switch 68 on the raised portion of the cam surface for closing the contact 69.

In preparing the outdoor condition responsive control station 40 for operation, the contacts 44 and 45 for the thermostatic element 43 are set to maintain a desired operating differential, for example, the contact 44 is closed by the thermostatic element at a temperature of 69° F., and the contact 45 is closed at a temperature of 65° F. The resistance 49 on the control panel is then adjusted for regulating the heat supply to the controller 40 in accordance with the design temperature of the building heating system as indicated on the design temperature scale of the ammeter.

In the operation of the system the thermostatic element 43 of the outdoor condition responsive control station 40 is connected in a circuit for the direct control of the relay 50. The thermostatic element 43 responds to the temperature of the control station 40 to close contacts 44 and 45 and energize the relay 50 when the temperature falls to the predetermined minimum of, for example, 65° F. The circuit for the initial energization of the relay includes the thermostatic element 43, contact 45, wire 70, relay coil 50, wire 73, the secondary of the transformer 21, the wires 74 and 75, switch 61, wire 76, switch 68, contact 69, wire 71 and the adjustable contact 44 for the thermostatic element 43.

The energization of relay 50 serves, through an armature shown in dotted lines, to actuate switches 51, 52 and 53 for closing the contacts 54, 55 and 56, respectively. A holding circuit for the relay is completed by closure of the switch 51 with contact 54. This circuit includes the relay coil 50, switch 51, wire 72, thermostatic element 43, adjustable contact 44, wire 71, switch 68, wire 76, switch 61, wire 75, wire 74, transformer 21 and the wire 73 returning to the relay coil 50. The operation of the holding circuit is such as to assure the energization of the relay coil 50 until the control station rises to a predetermined temperature of, for example, 69° F., at which time the thermostatic element 43 separates from the contact 44.

In the systems described in connection with the Taylor patents referred to above, the outdoor condition responsive device 40 serves to control the operation and non-operation of the heat supplying means to maintain a desired average temperature for both the outdoor condition control station 40 and for the zone being conditioned. In the present system, the operation of the relay 50 by the controller 40 serves through operation of the switch 52 and contact 55 to control the operation and non-operation of the heating means 46 of the controller for maintaining the desired average temperature of the control station 40. The controller station heating circuit includes the heating element 46, wire 74, ammeter A, adjustable resistance 49, the transformer secondary winding 21, wire 73, switch 52, contact 55, and the wire 78 returning to the heating resistance coil 46.

The control circuit for the motor 5 for regulating the steam supply valve includes the outdoor temperature responsive capsule 31 and the modulating controller 30. The controller 30 may be adjusted so that the potentiometer slider arm is, for example, positioned at the right end of the potentiometer resistance at a temperature of 0° F. and will be operated to a position at the left end of the potentiometer resistance when the outdoor temperature is 85° F. Outdoor temperature responsive bulb 31 operates the bellows 32 to position the pivoted and biased slider arm 33 with respect to the potentiometer resistance 34 for the graduated positioning of the valve actuating motor in accordance with variations in the outdoor temperature. As shown, the motor control circuit is of the balanced resistance type having a common leg which includes the motor 5, wire 80, wire 73, secondary winding of transformer 21, wires 74 and 75, switch 61, wire 85, and the potentiometer slider arm 34. This common leg is included in a circuit with the potentiometer resistance to the right of the potentiometer slider arm, wire 86, wire 88, adjustable resistance 60, switch 53 and contact 57, and the wire 82 to the motor 5. The common leg is also included in a circuit with the potentiometer resistance to the left of the slider arm, wire 87 and wire 81.

The operation of the motor control circuit is such that as the position of the potentiometer slider arm is varied in response to outdoor temperature the resistance between the common control leg and the separate legs of the control circuit is correspondingly varied with a resultant unbalance of the circuits and a corresponding operation of the motor and valve.

When the relay coil 50 is energized and the armature closes the switch 53 with the contact 56 the resistance 60 is shunted out of the leg 82 of the control circuit and this leg of the circuit then includes the resistance to the right of the potentiometer slider arm, wire 86, wire 90, contact 56, switch 53, and wire 82 to the motor. The circuit is unbalanced by reason of the resistance 60 being shunted from the control circuit and the motor is operated in a valve opening direction for a predetermined portion of the operating range of the valve. The deenergization of the relay serves to actuate the switch 53 for closing contact 57 and again inserting the resistance in the leg 82 of the control circuit with the result that the motor is operated in a valve closing direction for the predetermined portion of the operating range of the valve. The adjustment of the resistance 60 will determine the extent of the valve operation which will result as the resistance 60 is included in and shunted out of the leg of the control circuit.

The auxiliary variable resistance 60 which is mounted on the panel 26 may be assumed to have a total resistance of 300 ohms and to be so adjusted as to insert a resistance of 80 ohms in the leg 82 of the motor control circuit. Under these conditions when the relay 50 operates the switch 53 to close contact 56 and shunt out resistance 60 the motor control circuit is sufficiently unbalanced to cause the motor to operate the valve in an opening direction for 30% of its full operating range at which point the motor control circuit is again restored to balance. If it is assumed that the outdoor temperature remains at 30° F. with the controllers and auxiliary resistance set in the manner described the valve will operate between approximately 35% open and 65% open in response to the demands of the outdoor condition responsive controller 40. As the outdoor temperature decreases the valve will be operated over the same percentage of travel between its minimum and maximum positions, or 30% but due to the operation of the controller 30 these minimum and maximum positions will be shifted toward the open position of the valve. Thus, with an outdoor temperature of 10° F. the valve will operate between approximately 58% open and 88% open, and with an outdoor temperature of 50° F. the valve will operate between approximately 11% open and 41% open. This operation of the valve is illustrated in Figure 2 of the drawing wherein the reference characters A—B represent valve positions for an outdoor temperature of 30° F., C—D represent valve positions for an outdoor temperature of 50° F. and E—F represent valve positions for an outdoor temperature of 10° F. It is thus apparent that changes in outdoor temperature actuate the capsule 31 and controller 30 in combination with the auxiliary resistance to shift the valve maximum and minimum positions between 0% and 100%.

If the auxiliary resistance 60 is varied, the amount of valve operation which will result as the resistance is inserted into or shunted from the control circuit is correspondingly varied. For example, the valve will travel 30% of the total distance between valve open and valve closed positions with an auxiliary resistance 60 of 80 ohms in the circuit. If this resistance is increased to 90 ohms the valve will travel 33% of the full operating range, and if the resistance is reduced to 70 ohms the valve travel is reduced to 26% of the full operating range.

Variation in the operating differential of the potentiometer slider arm 33 of the controller 30 will correspondingly vary the percentage of valve openings for mild weather and also vary the rate of change in percent of opening with respect to changes in outdoor temperature. For example, if the potentiometer is adjusted as noted above with a main scale setting at 0° F. and an operating differential of 85° and with an auxiliary resistance of 70 ohms in the circuit, the valve will close completely at approximately 63° F. If the differential is reduced to 70°, the valve will close completely at 52° F. and will operate from this position to the position determined by the controller 30 upon a demand by the outdoor condition responsive controller 40 for heat. It is obvious that by reducing the operating differential of the potentiometer controller 30 a given change in the outside temperature will result in higher minimum and maximum valve positions.

With the controller 30 set for operation at from 0° F. to 85° F. and the auxiliary resistance set at 80 ohms, the valve will operate between the limits of 30% open and completely closed at an outdoor temperature of 60° F. Thus, at low outdoor temperatures accompanying cold weather, a continuous flow of steam is provided and at the higher outdoor temperatures accompanying mild weather an on and off operation of the valve is obtained.

The invention as illustrated may be applied to the control of various types of steam and hot water heating systems and will serve with a minimum of equipment to meter a minimum flow of heating medium to properly maintain desired zone temperatures. The operation of the system is such as to eliminate any overheating due to the sun and overheating due to the wind together with the distribution difficulties encountered by systems which control the supply of heating medium in either an "on and off" manner, or in a modulating manner for all outdoor temperatures.

It will be apparent that the present invention may be applied to systems of direct heat exchange control or of control for valves and dampers supplying a medium for use in connection with the conditioning of a zone or a plurality of zones and that the embodiment herein described is merely illustrative. The invention is accordingly to be limited only by the scope of the appended claims.

We claim as our invention:

1. In a temperature control system, in combination, a temperature changing device movable in reverse directions throughout a given wide range of movement, reversible electric motor means in control of said device capable of moving said device throughout its complete range of movement, a circuit including variable impedance means associated with said reversible electric motor means capable of reversibly controlling the operation of said motor means throughout its wide range, temperature responsive means for gradually varying said impedance means, a second variable impedance means associated with said circuit and capable of causing operation of said motor means over a narrow range of movement, and temperature responsive means for placing said second variable impedance means in or out of said circuit.

2. In a temperature control system, in combination, a temperature changing device movable in reverse directions throughout a given wide range of movement, reversible electric motor means in control of said device capable of moving said device throughout its complete range of movement, circuit means controlling the operation of said motor means, said circuit including a variable impedance means capable of reversibly controlling the operation of said motor means throughout its wide range, temperature responsive means for gradually varying said impedance means, a second variable impedance means associated with said circuit and capable of causing movement of said motor means over a narrow range, and temperature responsive means for making said second impedance means operative or inoperative in said circuit.

GEORGE D. GULER.
GEO. M. KINGSLAND.